H. C. NOACK.
ELASTIC TUBE FOR FIRE HOSE.
APPLICATION FILED MAY 19, 1915.
1,175,373.
Patented Mar. 14, 1916.
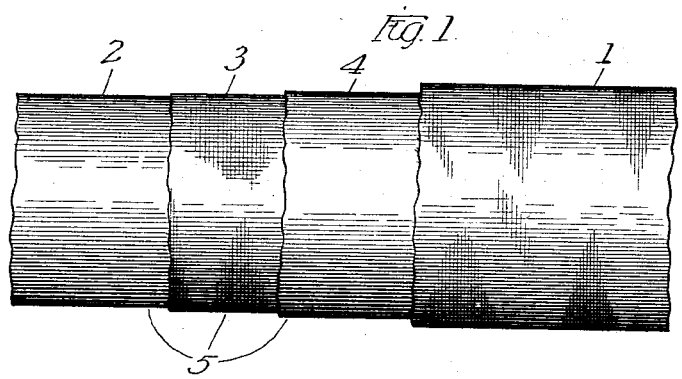
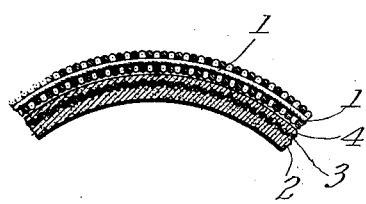
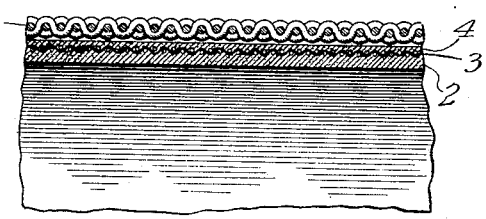
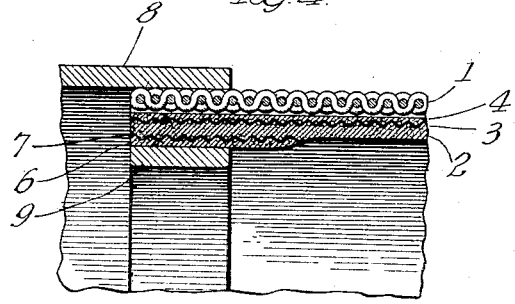
Witnesses:
Robert H. Weir
Ernest W. Papalee
Inventor
Herman Carl Noack
By Brown, Hanson & Bottcher
Attys.

UNITED STATES PATENT OFFICE.

HERMAN CARL NOACK, OF CHICAGO, ILLINOIS.

ELASTIC TUBE FOR FIRE-HOSE.

1,175,373.  Specification of Letters Patent.  Patented Mar. 14, 1916.

Application filed May 19, 1915. Serial No. 29,073.

*To all whom it may concern:*

Be it known that I, HERMAN CARL NOACK, a citizen of the United States, residing at Chicago, in the county of Cook and State of Illinois, have invented a certain new and useful Improvement in Elastic Tubes for Fire-Hose, of which the following is a full, clear, concise, and exact description, reference being had to the accompanying drawings, forming a part of this specification.

The present invention relates to an elastic tube for fire hose.

As is well known in the art, fire hose is subjected to very severe conditions of use. In case of fire much depends upon the immediate readiness and upon the reliability of the hose and it is the chief object of my invention to provide a hose of an improved structure, such that the same will be of maximum strength for a given amount of material and which will be reliable and dependable at all times.

Fire hose as heretofore constructed and as known in the prior art consists of an outer cotton sleeve or jacket of heavy and thick weave which serves as armor for a rubber tube that is contained within the same. The rubber lining is provided for making the hose water tight. The rubber tube has heretofore been attached to the jacket at one or more points but this has always subjected the rubber tube to undue stresses. The tube has been left free at the sides where the bend is made in rolling up the hose and the tube soon cracks and deteriorates at this point. It has been proposed to have the rubber sleeve loose in the jacket and reinforce the side where the bend occurs, but this subjects the tube to unequal stresses as the tube is required to stretch unequally and it has a further detrimental effect in tending to cause twisting and improper folding of the tube inside the jacket when the hose is rolled up on the reel.

According to my invention I construct the rubber tube with a substantially inextensible lengthwise but circumferentially elastic reinforcement, such that the tube is not subjected to unequal stresses in filling the jacket but will receive reinforcement uniformly at all points.

The disadvantage of a loose tube in the jacket heretofore has been found to be a longitudinal or lengthwise stretching of the rubber tube within the jacket. Furthermore the sudden rush of water through the hose and the friction of the water along the sides has tended to move the rubber tube in the direction of the flow of water and has caused the same to be shifted longitudinally and stretched to a dangerous point.

I shall now describe one embodiment of my invention in connection with the accompanying drawings, which form a part of the present specification.

Figure 1 is a side elevation showing the structure of a section of fire hose made up according to my invention. Fig. 2 is a sectional view illustrating the elastic tube inserted in the jacket. Fig. 3 is a sectional view taken at right angles to Fig. 2, and Fig. 4 illustrates the manner in which the tube and jacket are connected to the hose coupling and to each other.

The jacket 1 consists of heavy woven cotton material which may be of a single or double thickness. This jacket is inelastic in all directions and serves to confine the elastic tube which is loose within the same. The elastic tube consists of an inner tube 2 of rubber, a thickness of fabric 3 and an outer ply of rubber 4.

The middle ply 3 of the inner tube 5 is composed of a textile fabric which is inelastic or substantially so in the direction of its length, that is, in the direction of the length of the hose, but is elastic circumferentially so that the tube 5 may fill the jacket 1 when the same is subjected to pressure. The ply of fabric 3 is a seamless sleeve of braided, knit or woven material.

I wish it to be distinctly understood that the inner layer of rubber 2, and the outer layer of rubber 4 are made continuous through the interstices of the fabric 3, the two parts being vulcanized together. The fabric 3 is thus incorporated in the tube 5 to form a tube or lining which is elastic circumferentially but is substantially inelastic in the direction of its length.

The inner tube 5 is symmetrical on all sides and can be put inside the jacket 1 in any position. It is not necessary that any particular portion be made to form the bend at the side, as is necessary in devices in the prior art.

In Fig. 4, I have illustrated the manner in which the tube 5 is connected to the jacket 1 at the point where the hose coupling is formed.

At the end of the hose where the joint is to be formed I preferably add an additional ply 7 of elastic fabric similar to the fabric 3, and secure it to the main part of the tube 5 by means of the ply 6 of rubber which is vulcanized to and through the fabric 7 to the ply 2. The end of the jacket 1 and the tube 5 are then gripped between the outer ring 8 and the inner ring 9, which is expanded so as to grip the jacket and the tube securely between them.

If desired, the relation of the parts 8 and 9 may be reversed; that is to say, if the coupling is formed by an internal sleeve 8, the ring 9 will then be placed on the exterior and will be shrunk upon the sleeve 8, gripping the jacket and the tube 5 between these parts.

The tube which is constructed according to my invention is not to be confused with hose and the like, such as appear in the prior art. In those structures the aim is to render the tubes inelastic. In the present case the aim is to have an elastic reinforcement which will allow circumferential expansion but will allow only a limited elongation.

The elastic fabric sleeve which may consist of braided knitted or woven material is protected from moisture through or in the outside jacket by the outer rubber ply 4 and from the water or moisture passing through the inside of the tube by the inner ply 2.

It will now be apparent that I have provided an elastic tube for fire hose of great utility and durability. The inner elastic tube remains water tight under all reasonable conditions of wear and service. The tube is uniformly reinforced on all sides and it is impossible for the same to be placed wrong and folded wrong in the jacket 1.

While I have shown and described a particular embodiment of my invention, I do not intend to limit myself to the details shown and described, but desire that the appended claims be interpreted with all due liberality, in view of the prior art.

What I claim as new and desire to secure by Letters Patent of the United States is the following:

1. In a fire hose, the combination of an outer relatively inelastic jacket and an elastic tube within the same, said tube connected to said jacket only at the ends thereof, said tube comprising a ply of rubber, a ply of tubular elastic fabric and an outer ply of rubber, the two rubber plies being vulcanized together to and through said fabric.

2. An elastic inner water-tight tube for fire hose comprising an inner tubular sleeve of rubber, a tubular sleeve of circumferentially elastic fabric surrounding said inner rubber sleeve, and an outer tubular rubber sleeve surrounding said sleeve and fabric, said rubber sleeves being vulcanized together to and through said fabric.

3. An elastic tube for fire hose comprising an imperforate rubber tube with a thin tube of circumferentially elastic fabric incorporated within the body thereof, said elastic fabric being substantially inextensible in the direction of the length of the tube.

4. In combination, an outer relatively inelastic jacket, an inner elastic tube having a tubular circumferentially elastic reinforcing fabric incorporated therein, an outer metallic ring surrounding the end of the jacket, and an inner metallic ring within the end of the jacket and the tube, said inner ring being expanded to grip the jacket and the tube between the outer ring and itself.

In witness whereof, I hereunto subscribe my name this 15th day of May, A. D. 1915.

HERMAN CARL NOACK.

Copies of this patent may be obtained for five cents each, by addressing the "Commissioner of Patents, Washington, D. C."